United States Patent [19]
Holko et al.

[11] 3,770,933
[45] Nov. 6, 1973

[54] APPARATUS FOR WELDING BLADES TO ROTORS

[75] Inventors: Kenneth H. Holko, Strongsville; Thomas J. Moore, Berla, both of Ohio

[73] Assignee: The United States of America as represented by the Administrator of the National Aeronautics and Space Administration

[22] Filed: Apr. 24, 1972

[21] Appl. No.: 247,055

Related U.S. Application Data
[62] Division of Ser. No. 134,658, April 16, 1971.

[52] U.S. Cl................... 219/107, 219/101, 219/78, 29/497.5
[51] Int. Cl............................................. B23k 11/04
[58] Field of Search.................... 219/101, 102–104, 219/107, 78, 86, 62, 99; 29/497.5, 498, 471.7, 497

[56] References Cited
UNITED STATES PATENTS

| | | | |
|---|---|---|---|
| 2,776,362 | 1/1957 | Welch | 219/86 |
| 3,053,971 | 9/1962 | Busse | 219/107 |
| 2,905,804 | 9/1959 | Wakeley | 219/86 |
| 2,948,804 | 8/1960 | Schueler | 219/86 |

*Primary Examiner*—R. F. Staubly
*Assistant Examiner*—L. A. Schutzman
*Attorney*—N. T. Musial et al.

[57] ABSTRACT

Using magnetic force upset welding to form T-joints between dissimilar thickness parts. This type of resistance welding is used to join compressor and turbine parts thereby reducing the weight and cost of a jet engine.

5 Claims, 5 Drawing Figures

PATENTED NOV 6 1973

3,770,933

3,770,933

APPARATUS FOR WELDING BLADES TO ROTORS

RELATED APPLICATION

This application is a division of copending application Ser. No. 134,658 filed Apr. 16, 1971.

ORIGIN OF THE INVENTION

The invention described herein was made by the employees of the United States Government and may be manufactured and used by or for the Government for governmental purposes without the payment of any royalties thereon or therefor.

BACKGROUND OF THE INVENTION

This invention is concerned with producing high quality welded joints between sections of greatly different thickness. The invention is particularly directed to welding compressor and turbine blades to rotors and discs.

Cast blades are customarily used in compressors and turbines. These blades have large bases which are received by mating slots in a drum. Thick drums are required so that the slots can be cut sufficiently large to receive the blade bases. These factors increase the weight of a jet engine.

It has been proposed that compressor and turbine blades be joined to rotors and disks by welding. However, most of the conventional welding processes are not readily applicable to making a T-joint between sections of greatly differing thicknesses because the thinner sections are heated more rapidly than the thicker ones. This produces poor quality welds because the heating is not concentrated at the interface formed at the T-joint junction.

Resistance welding has been suggested for these applications because maximum heat is developed at the interface where resistance is high. However, in the conventional move of several cycles or more of current, there is sufficient time for unequal heat dissipation to occur away from the interface. Weak welds result from this insufficient interfacial heating.

Electron beam welding has also been suggested for attaching blades to drums. However, this procedure is both costly and complicated.

SUMMARY OF THE INVENTION

These problems have been solved by the resistance welding apparatus of the present invention which utilizes low initial electrode pressures, short welding times, and high welding current densities. These features are combined with the application of a delayed, rapidly rising magnetic force to concentrate the heating effect at the interface between the dissimilar thicknesses rather than in the bulk material.

OJBECTS OF THE INVENTION

It is, therefore, an object of the present invention to provide apparatus for joining members of dissimilar thicknesses by resistance welding with little or no melting of the parent material. More particularly, the solid-state and/or fuson modes of resistance welding are used.

Another object of the invention is to provide welded components for a low-cost, lightweight small jet aircraft engine.

A further object of the invention is to provide a resistance welding apparatus for joining blades to rotors of lightweight jet engines.

These and other objects of the invention will be apparent from the specification which follows and from the drawing wherein like numerals are used throughout to identify like parts.

DESCRIPTION OF THE PREFERRED EMBODIMENT

Figure 1:
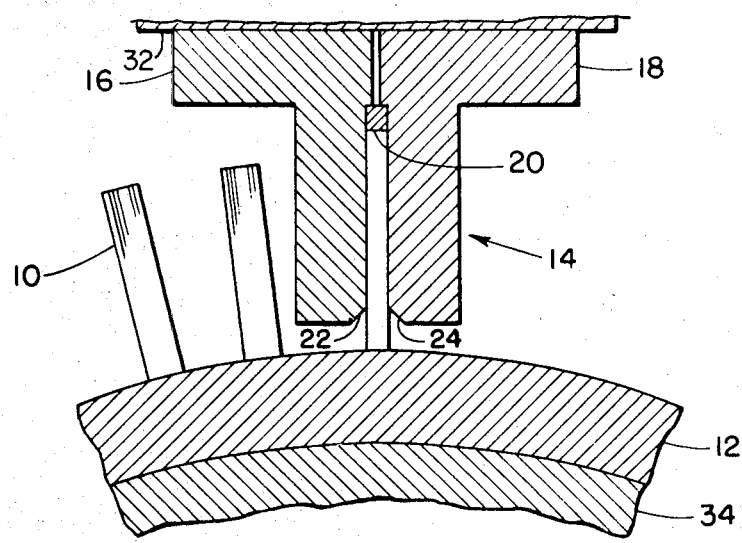
FIG. 1 is a vertical section showing an unbeveled blade positioned in electrode tooling constructed in accordance with the invention for welding to a rotor.

Referring now to the drawing, there is shown in FIG. 1 a portion of a lightweight jet engine fabricated in accordance with the present invention. A plurality of blades 10 are resistance welded to a rotor 12.

One of the blades is shown mounted in an electrode 14 prior to welding. This electrode forms tooling that must be capable of holding each blade 10, conducting high currents during operation, and transmitting upset forces to the blade bases.

The electrode 14 is comprised of two sections 16 and 18 that are assembled by bolts and pins. Both sections 16 and 18 are of an electrically conductive material, such as copper, that is capable of conducting high currents. All bolts, pins, and locating buttons used in assembling the sections 16 and 18 are made of nonmagnetic material to prevent the establishment of magnetic fields which might deflect and disturb current flow. All conducting surfaces of the electrode 14 are silver plated to decrease the contact resistance and minimize pitting of the electrode from welding spatter.

A spacer 20 is positioned between the section 16 and 18 of the electrode 14. The spacer contacts the upper edge of the blade 10 during the welding operation. Spacers 20 of different thicknesses can be used to vary the extension of the blade 10 beyond the electrode 14. The spacer 20 also transfers pneumatic and magnetic forces from the electrode 14 to the blade. The spacer 20 is likewise of a nonmagnetic electrically conducting material, such as copper.

The lower surface of the electrode surface 16 which faces the rotor 12 has a chamfered end portion 22 adjacent the blade 10. The electrode section 18 has a similar chamfered end portion 24. The chamfered surfaces 22 and 24 determine the contour of the welded blade blase. An angular contour at the joint between the blade 10 and the rotor 12 reduces the stress concentration. A chamfer of 45 degrees has been satisfactory to form a fillet as the junction of the blade 10 and rotor 12.

It is also contemplated that a radius can be formed on the surfaces 22 and 24 instead of the straight 45 degree chamfer shown in FIG. 1. Such a radiused chamfer will produce a similarly radiused fillet at the weld.

Figure 2:
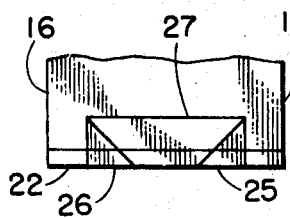
FIG. 2 is a partial view, in elevation, of the inside surface of the tooling and is shown at a right angle to FIG. 1 illustrating an alternate embodiment of the invention utilizing an insert in the end of the electrode tooling.

Referring now to FIG. 2 there is shown wedge shaped inserts 25 and 26 in the electrode 14. These inserts are used to shape the current and heating patterns at the interface between the blade and the rotor. The inserts 25 and 26 are preferably molybdenum and are properly positioned by a copper block 27. The inserts and the block are chamfered along the lower edge.

The lower edge of the blade 10 that is to be welded to the rotor 12 extends outward from the lower edge of the electrode 14. This extension is extremely important in forming the weld at the proper location. This weld should be formed at the interface between the lower edge of the blade and the rotor surface. The extension is determined by the thickness of the spacer 20.

Figure 3:
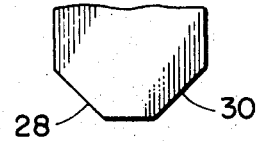
FIG. 3 is an enlarged view of the end of a blade which has been beveled prior to welding.

The lower edge of the blade 10 shown in FIG. 1 is substantially flat. The sides adjacent to this lower edge may be beveled at 28 and 30 as shown in FIG. 3. By beveling the blade 10 the initial contact thickness is changed. Also by changing the bevel angle the shape of the final weld between the blade 10 and the rotor 12 is changed.

Figure 4:
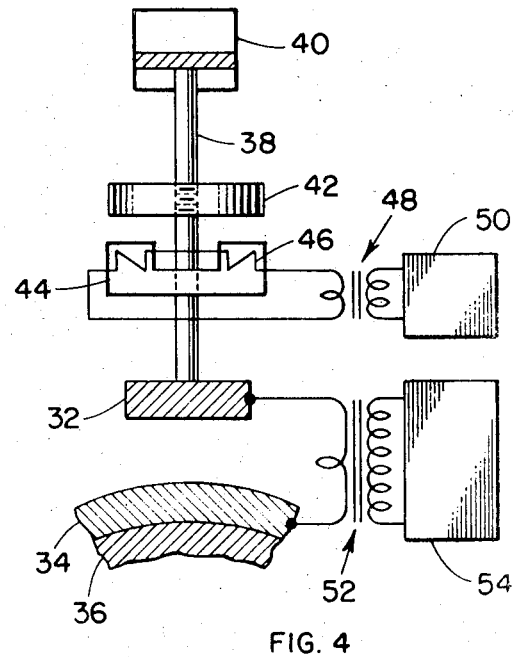
FIG. 4 is a simplified diagram of the magnetic force upset welding equipment.

FIG. 4 is a simplified diagrammatic view of the apparatus for welding the blades 10 to the rotor 12 in accordance with the invention. This apparatus includes an upper platen 32 and a lower platen 34 shown in FIGS. 1 and 4. The upper platen 32 is movably mounted and carries the electrode tooling 14. The lower platen 34 is mounted on a fixed base 36. The upper platen 32 is secured to the lower end of a reciprocable shaft 38 having its upper end connected to the piston of an air cylinder 40.

A magnet armature 42 of a 120 hertz electromagnet is connected to the shaft 38 between the air cylinder 40 and the upper platen 32. A magnet stator 44 mounted below the armature 42 encircles the shaft 38. The armature 42 is adjustably mounted on the shaft 38 to enable the magnet air gap between the armature 42 and the stator 44 to be suitably adjusted. A copper coil 46 is wrapped about the stator 44 and is electrically connected to a secondary winding of a magnet transformer 48. The primary winding of the transformer 48 is connected to magnetic force control equipment 50.

A weld transformer 52 in a magnetic force upset welder has its primary winding connected to weld voltage control equipment 54. The secondary winding of the transformer 52 is connected to the upper platen 32 and lower platen 34. The weld voltage control equipment 54 varies the current which passes through the electrode tooling 14.

In operation, the blade 10 is mounted in the electrode tooling 14 with the upper platen 32 in a raised position. The space between the blade 10 and the rotor 12 forms a break in the welding transformer secondary of the magnetic force upset welder.

The blade 10 is brought into light contact with the rotor as shown in FIG. 1 by moving the piston in the air cylinder 40. The faying surfaces of the blade 10 and rotor 12 are maintained in contact by pneumatic pressure transmitted through the spacer 20. The blade 10 is then resistance welded by solid-state and/or fusion modes to the rotor 12.

Figure 5:
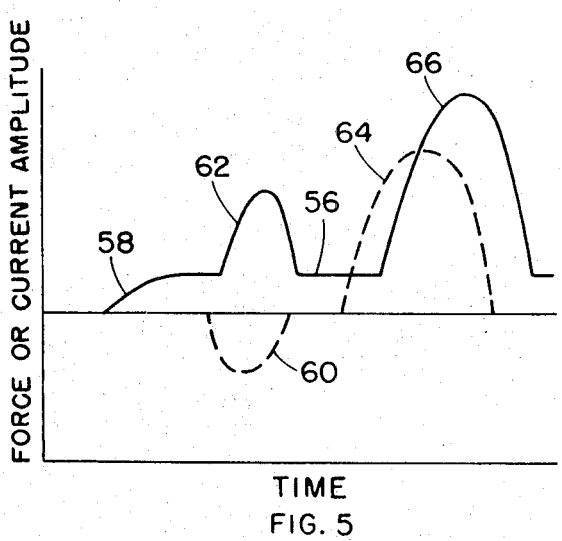
FIG. 5 is a plot of typical current and force waves used in magnetic force upset welding.

Referring now to FIG. 5 there is shown a plot of current and force waves used in magnetic force upset welding. These waves are less than one cycle of 60 hertz current and two cycles of 120 hertz force. The solid line 56 represents the force used during welding. As the faying surfaces of the blade and rotor are brought into contact, a pneumatic force shown by the upward curved portion 58 is applied. This force is maintained during the welding cycle.

A preheating current from the weld transformer 52 illustrated by the dotted line 60 is passed through the platens 32 and 34. This preheat current is regulated by the weld voltage control 54. After a very short time delay of about 0.5 millisecond, caused by mechanical inertia in the welding head, a preheat magnetic force is applied by the magnetic force control 50. This magnetic force is illustrated by the curved portion 62 in the solid line. The small preheat half-cycle provides both macro- and microalignment between the blades and rotor, incipient solid-state welding, and an increase in interfacial temperature.

A welding current illustrated by the dotted line 64 is then passed through the blade and rotor. The welding half-cycle 64 provides the bulk of heating necessary in the formation of the weld. After a small welding time delay of about 1.5 milliseconds a weld magnetic force illustrated by the curve 66 in the solid line is applied by the magnetic force control 50. This magnetic force 66 is approximately five times the pneumatic force 58. This magnetic force 66 is used to upset the heated blade and form a fillet at the chamfers 22 and 24 as the tooling 14 moves from the position shown in FIG. 1 toward the rotor 12.

The magnetic force upset welding utilized in the present invention differs from conventional resistance welding in that the forge force is applied by a 120 hertz electromagnet. The advantage is that the force-waves can be timed in duration and phase shifted in relation to the current half-waves as illustrated in FIG. 5. The heating is more effectively developed and concentrated at the interface in this manner. By delaying the initiation of the force half-wave after the initiation of the current half-wave, the current flows through an interface between the blade 10 and the rotor 12 that is under low pressure and has high electrical resistance. In this manner the resistance is high during current flow which increases the resistance heating at the interface. This precise timing within very short weld current times is essential for welding unequal sections. The magnetic force upset welding utilizes high welding current densities and short current times. By way of example, the welding current density is generally greater than $1 \times 10^6$ amperes per square inch, and the welding time is on the order of one one-hundred-twentieth second. The electromagnetic forging blow is precisely times with respect to the welding current.

A microscale liquid phase may be produced at the faying surfaces during magnetic force upset welding. Any molten material present tends to be forced out of the joint when the forging blow is applied. The resultant weld can be either entirely solid-state or a combination of solid-state and fusion. The absence of molten material at the joint assures minimum chemical segregation and minimum residual welding stress. Heat input to the joint is very low and is largely confined to the region immediately adjacent to the faying surfaces. This low heat input is quite desirable from a metallurgical standpoint.

Wave initiation, duration, and magnitude are dependent upon the setting of the weld control equipment 54. In the case of the magnetic force wave, the magnet gap may be adjusted as previously described to vary the force magnitude at one control setting. By adjusting this control setting and the magnet gap the time relation between the force initiation and the current initiation is varied while the force magnitude is held relatively constant.

While the preferred embodiment of the invention has been described it will be appreciated that various structural modifications may be made without departing from the spirit of the invention or the scope of the subjoined claims. By way of example it is contemplated that the invention may be used for positioning the blades 10 on the rotor 12 prior to electron beam welding. Indexing the blades could be precisely done by numerical control. After the blades have been resistance welded to the rotor as previously described an electron beam weld is made at the fillets.

What is claimed is:

1. Apparatus for resistance welding blades to rotors comprising mating sections of an electrically conducting nonmagnetic material for holding one of said blades, conducting an electric current thereto, and transmitting upset forces, each of said mating sections having chamfered portions for contouring the welds, spacer means between said mating sections for controlling the distance said blade extends from said sections and for transferring pneumatic and magnetic forces to said blade, pneumatic means for moving said mating sections and said blade into contact with said rotor and maintaining the faying surfaces of said blade and said rotor in contact by applying a substantially constant pneumatic force to said blade and said rotor, a source of electric current connected to said mating sections for passing high welding current densities through said contacting blade and rotor for short periods of time to heat the same at said faying surfaces, magnetic means for applying rapidly rising forces to said contacting blades and rotor through said mating sections during said heating to upset said blade and form a weld at the faying surfaces, and means for delaying the application of said magnetic forces for a short period of time after the passage of said heating currents.

2. Apparatus as claimed in claim 1 including a straight chamfer along an edge of each mating section facing the other member to be welded to form a fillet in the weld.

3. Apparatus as claimed in claim 1 including a radiused chamfer along an edge of each mating section facing the other members to be welded to form a fillet in the weld.

4. Apparatus as claimed in claim 1 including inserts in said mating sections to shape the current and heating patterns at the interface between the contacting members.

5. Apparatus as claimed in claim 4 wherein the mating sections are copper and the inserts are molybdenum.

* * * * *